United States Patent [19]
Harpell et al.

[11] Patent Number: 5,124,195
[45] Date of Patent: Jun. 23, 1992

[54] FLEXIBLE COATED FIBROUS WEBS

[75] Inventors: Gary A. Harpell; Dusan C. Prevorsek, both of Morristown, N.J.

[73] Assignee: Allied-Signal Inc., Morris Township, Morris County, N.J.

[21] Appl. No.: 463,178

[22] Filed: Jan. 10, 1990

[51] Int. Cl.$^5$ .............................................. B32B 05/12
[52] U.S. Cl. .................................... 428/245; 428/36.1; 428/142; 428/152; 428/247; 428/252; 428/911; 2/2.5
[58] Field of Search ...................... 26/50, 51; 428/247, 428/252, 232, 152, 142, 911; 2/2.5

[56] References Cited
U.S. PATENT DOCUMENTS

| | | | |
|---|---|---|---|
| 3,321,939 | 5/1967 | Bailey | 26/51 |
| 3,427,376 | 2/1969 | Dempsey | 26/51 |
| 4,681,792 | 7/1987 | Harpell et al. | 428/252 |
| 4,737,401 | 4/1988 | Harpell et al. | 428/247 |

Primary Examiner—George F. Lesmes
Assistant Examiner—Richard C. Weisberger

[57] ABSTRACT

A coated web or composite having improved flexibility. The coated web of the present invention comprises at least one layer and preferably at least two layers. The layers comprise a fibrous web located or embedded with polymeric composition. The coated web is flexed sufficiently over at least a portion of the web surface to have improved flexibility properties. The web can be flexed in a single direction along the surface or randomly along the whole surface. Preferably, the web is flexed sufficiently to form a plurality of permanent creases or wrinkles. The coated web has improved flexibility, and at the same time, impact resistant properties, such as ballistic resistance, are substantially maintained compared to an unflexed web.

26 Claims, 3 Drawing Sheets

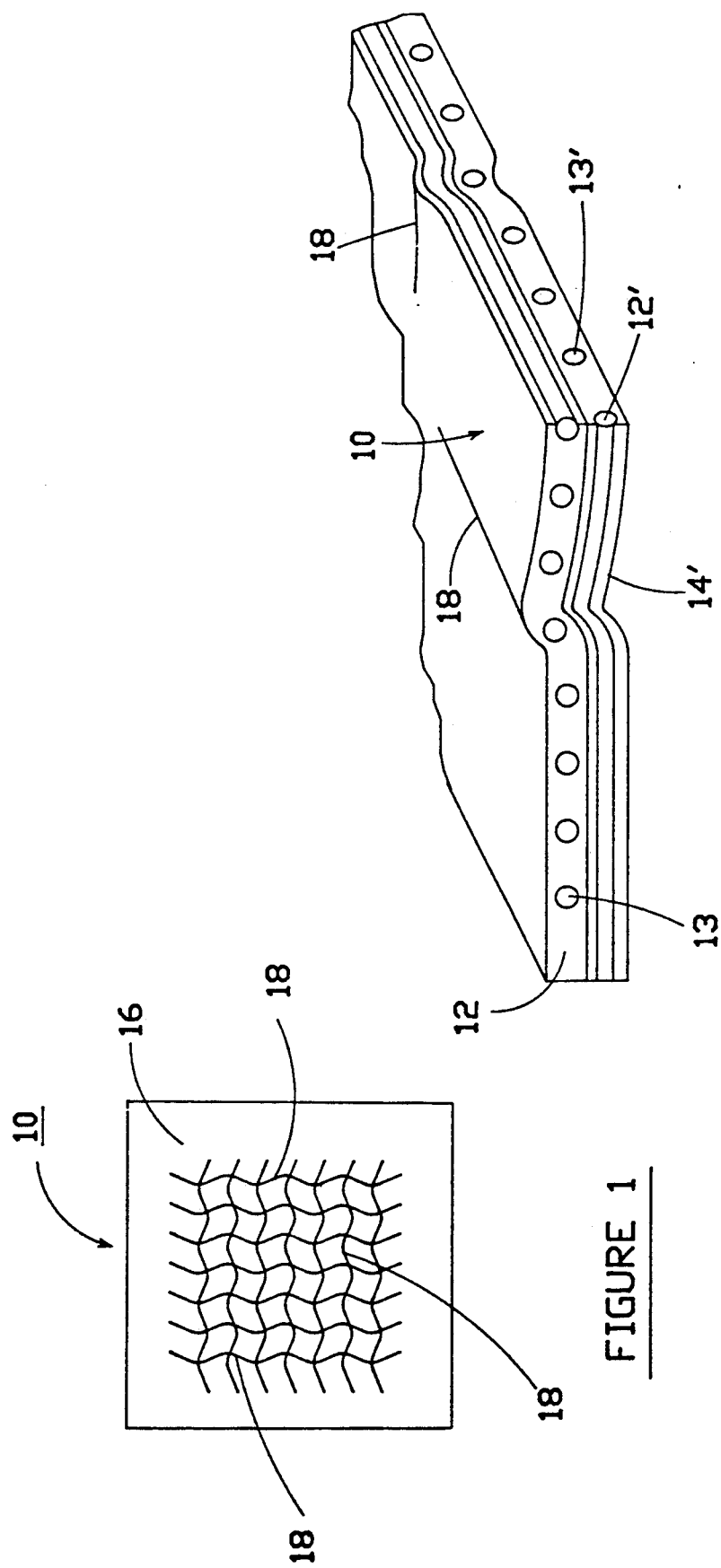

FLEXIBLE COATED FIBROUS WEBS

BACKGROUND OF THE INVENTION

The present invention is in the field of flexible polymer coated fibrous webs; more particularly the invention relates to flexible ballistic resistant fibrous composites.

Ballistic resistant articles, such as bullet proof vests, curtains, mats, raincoats and umbrellas, containing high strength fibers are known. Typically these articles are made of flexible fabrics. Fibers conventionally used include aramid fibers, such as poly(phenylenediamine terephthalamide), nylon fibers, glass fibers and the like. For many applications, such as vests or parts of vests, the fibers are used in a woven or knitted fabric.

While the ballistic resistance of articles made using such fabrics have been satisfactory in commercial applications, improvements are always desirable. A particular area for improvement relates to ballistic resistance apparel such as vests which contain layers of fabric.

Polymer coated or embedded fibrous webs useful in ballistic resistant articles are known and disclosed in patents such as U.S. Pat. No. 4,650,710 and U.S. Pat. Ser. No. 282,903 filed Dec. 12, 1988, now abandoned. As indicated in these disclosures it is a goal to improve the flexibility of polymer coated or embedded fibrous layers or webs. Coating a fibrous web with a polymeric material stiffens the web. However, the polymeric matrix or coating is necessary to maintain the structural integrity of the web. U.S. Pat. No. 4,650,710 is directed to flexible composites comprising a low modulus polymeric material.

SUMMARY OF THE INVENTION

The present invention is a coated web or composite having improved flexibility. The coated web of the present invention comprises at least one layer and preferably at least two layers. The layers comprise a fibrous web coated or embedded with polymeric composition. The coated web is flexed sufficiently over at least a portion of the web surface to have improved flexibility properties. Flexibility properties can be measured by the drape test recited below. The results of the drape test are indicated by a drape ratio. The drape ratio is the ratio of the drape value for an unflexed fibrous web to that of a flexed fibrous web. The drape ratio of the coated web of the present invention is greater than 1, indicating improved flexibility.

The coated web of the present invention is preferably uniformly flexed over at least a portion of the web surface. The web can be flexed in at least a single direction along the surface, preferably in at least two directions (i.e., longitudinal and transverse), and more preferably, randomly along the whole surface. Preferably, the web is flexed sufficiently to form a plurality of permanent creases or wrinkles. The web can be flexed one or more times at a single location to increase creasing.

The coated web of the present invention has improved flexibility, and at the same time, impact resistant properties, such as ballistic resistance, are substantially maintained compared to an unflexed web.

BRIEF DESCRIPTION OF THE DRAWINGS

FIG. 1 is a top view of a coated web of the present invention having a plurality of permanent creases distributed over the web surface.

FIG. 2 is an enlarged sectional view of a portion of a crease in the web of FIG. 1.

DETAILED DESCRIPTION OF THE INVENTION

Figure 4:
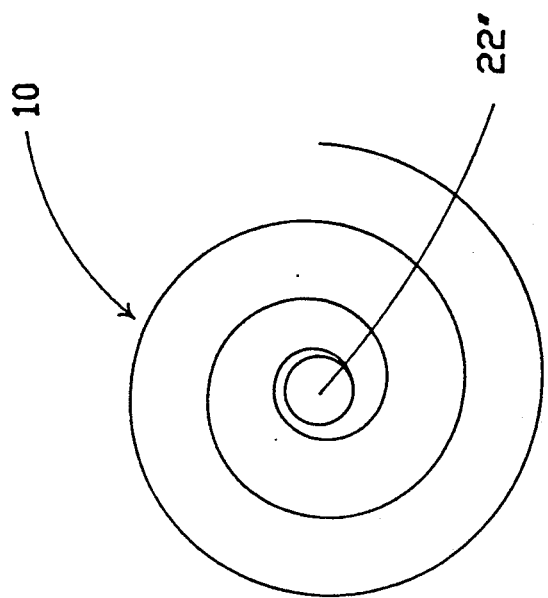
FIG. 4 is an end view of a rod wrapped with a coated fibrous web.

The present invention will be understood by those skilled in the art by reference to the accompanying figures. The present invention is a fibrous web coated with or embedded in a polymeric composition. The coated web is flexed sufficiently over at least a portion of the web surface to have improved flexibility.

FIGS. 1 and 2 illustrate a preferred embodiment of the present invention. A coated web 10 comprises at least one, and preferably two, fibrous layers 12, 12'. Each fibrous layer 12, 12 has fibers 13, 13' coated or embedded in a polymeric composition 14, 14'. The web has edges and a surface 16.

The fibers 13, 13' in each layer 12, 12' are preferably unidirectional. By unidirectional it is meant that the fibers within each fibrous layer 12, 12' are substantially parallel, i.e., in the same direction. The coated web 10 is flexed sufficiently over at least a portion of the web surface 16 to improve its flexibility.

In the embodiments shown in FIGS. 1 and 2, the flexing results in a plurality of permanent creases 18. Preferably, the creases are uniformly distributed over at least a portion of the area of the web surface 16. The creases are preferably made by flexing in a direction along the fibrous web 10, parallel to at least some of the fibers 13, 13' in at least one fibrous layer 12, 12'. Where the fibrous webs are unidirectional, the creases are made by flexing in substantially the same direction as the fibers in at least one of the fibrous layers, i.e., 12 or 12'. Where fiber in different fibrous layers are in different directions, then the web 10 is preferably flexed in at least two directions, substantially parallel to fiber in at least one fibrous layer. Preferably, the creases are distributed uniformly over the portion of the web that is flexed. The number of creases per unit area is preferably constant, although the location and direction of the creases in a unit area can randomly vary.

Figure 3:
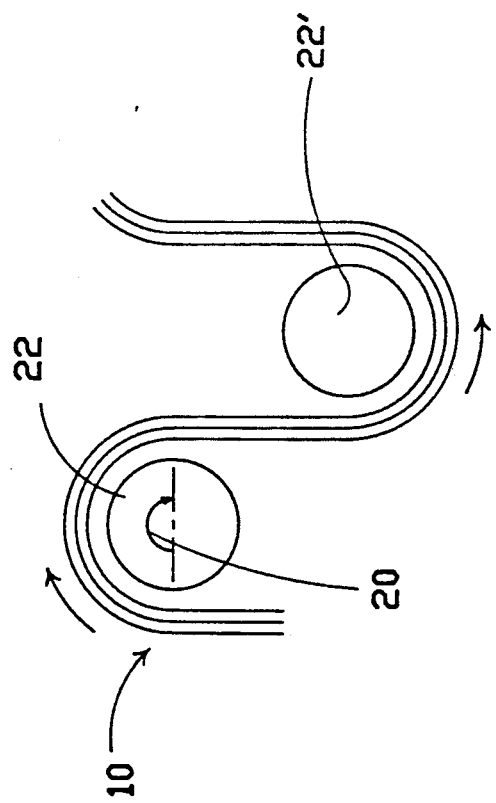
FIG. 3 is a side view of a fibrous web coated with a polymer composition being folded over two rods.

FIG. 3 illustrates a preferred embodiment of the present invention and methods to attain this embodiment. The coated web is sufficiently folded to form creases 18. Typically, the web is folded at a fold angle 20, of at least 45°, preferably from 45° to 270° and most preferably, at an angle of 90° to 180° around the rod 27, 27'. The folded web is folded along the surface of the web as it passes over rods 22 and 22' which can optionally rotate. Alternately, the web 10 can be wrapped around itself or preferably, a rod having a diameter of at least ⅛ inch, preferably ¼ inch to 4 inches, more preferably, ¼ to 3 inches, and most preferably, 0.5 to 2.5 inches, such as rod 22" in FIG. 4. The web can be wrapped around the rod a plurality of times. Optionally, the part of the wrap can be reversed, that is, wrapped around the opposite portion (i.e., side) as the initial wrap.

The folded web can be folded in a single direction, preferably in the direction of unidirectional fibers in one layer. Additionally, the web can be folded in the direction of fibers of at least one additional layer. The web can be folded in a plurality of directions in addition to the direction of the fibers in the various layers.

The sufficiency of the flexing is indicated by an increase in drape flexibility. Drape flexibility is measured using a flat horizontal surface which intersects a vertical surface to produce a straight edge. The test is conducted using an individual 15 inches by 15 inches square coated fibrous panel. One side of the panel is supported on the flat surface having a free edge with 11 inches (279 mm) overhanging the straight edge of the surface. The horizontal distance of the unsupported fibrous panel edge to the vertical surface is measured. The drape ratio is the ratio of the horizontal distance of an unflexed panel divided by the horizontal distance to the edge of the flexed panel. The coated web of the present invention is flexed sufficiently over at least a portion of the web surface to have a drape ratio of at least one. Prior to testing, the coated web is flattened on the horizontal surface to assure that the distance from the edge of the sample to the straight edge is not reduced as a result of a major fold in the coated web. The plane through the sample web should be substantially flat with the exception of the creases resulting from flexing.

The coated web of the present invention has improved flexibility as measured by the drape test, resulting in a drape ratio of greater than one, preferably greater than 1.1, more preferably greater than 1.2 and yet more preferably, greater than 2.0 and most preferably greater than 5. Surprisingly, it has been found that the flexing of the coated web does not substantially, adversely affect ballistic resistance of the web.

A particularly preferred embodiment of the present invention is a coated web 10 comprising at least two adjacent layers 12, 12' with each layer comprising a plurality of unidirectionally oriented fibers 13, 13' embedded in a polymer composition 14. The fibers in adjacent layers are preferably at an angle of from 45° to 90° to each other, and most preferably, at an angle of about 90° to each other. The coated web is flexed sufficiently over at least a portion of the web surface to have a drape ratio of greater than one.

The preflexed web 10 is drawn over rod 22 and results in the flexed web 10 of the present invention. When using unfilled polymeric matrix it has been observed that the polymeric composition is translucent prior to flexing and becomes cloudy after flexing.

It is believed that the improved flexibility results from a combination of the effects of flexing on: the polymeric matrix, the fibrous web; and the combination of polymer matrix and fibrous web.

The coated web of the present invention is designed to have flexibility so that it can be used in impact resistant and particularly ballistic resistant apparel, such as vests, pant inserts, coat inserts, lapels, or the like.

The flexing has been found to increase flexibility and substantially maintain excellent resistance to ballistic projectiles in a direction normal to the surface of the fabric as well as impact from projectiles which strike the article obliquely to the surface of the fabric.

A useful coated web of the present invention comprises an array of at least two adjacent coplanar, fibrous elements. Each element comprises a plurality of unidirectional fibers embedded in a polymer matrix. The fibers in each fibrous layer can be continuous long fibers or shorter fibers in coplanar elements from 1 to 20 and preferably 2 to 8, and more preferably 2 to 6 inches long. The adjacent coplanar elements are connected through a polymer matrix.

A preferred coated web of the present invention is multilayer composite comprising a plurality of the fibrous layers. The fibers of adjacent layers are at an angle of from 45° to 90°, preferably 60° to 90°, more preferably 80° to 90°, and most preferably at an angle of about 90° from each other. The coated web preferably comprises 1 to 100, preferably 1 to 50, most preferably 2 to 20, and yet more preferably 2 to 10 fibrous layers. The minimum number of layers can be greater than 1, i.e., 4 or 5, but stiffness increases with the number of layers. The composite is useful to form planar flexible armor and can be formed to three dimensional articles.

The composite articles preferably comprise high strength fibers having a tensile modulus of at least about 160 grams/denier and a tenacity of at least about 7 grams/denier, and preferably at least 22 grams/denier in a polymer matrix which is preferably an elastomeric matrix having a tensile modulus of less than about 20,000 psi (138 mPa), and preferably less than 6000 psi (41 mPa) (measured at according to ASTM D638-84 at 25° C.) The composite articles of the present invention has improved impact resistance.

For the purposes of the present invention, fiber is an elongated body, the length dimension of which is much greater than the transverse dimensions of width and thickness. Accordingly, the term fiber includes monofilament fiber, multifilament fiber, ribbon, strip, a plurality of any one of combinations thereof and the like having regular or irregular cross-section.

Depending on the application for use of the coated web in the multilayer composite of the present invention, different fibers and different matrices can be used. Useful fibers include polyolefin based polymers and particularly ultra high molecular weight polyolefin fibers, including polyethylene and polypropylene fibers. Other useful high strength fibers include aramid fibers, polyvinyl alcohol fibers and other high strength fibers. Also useful in the present invention are a variety of conventional fibers which would result in improvement in resistance to impact properties when used in accordance with the present invention. Such fibers include, but are not limited to, asbestos, carbon, graphite, boron, cellulose, alumina, and metal fibers.

Fiber useful in the present invention include highly oriented ultra-high molecular weight polyethylene fiber, highly oriented ultra-high molecular weight polypropylene fiber, aramid fiber, polyvinyl alcohol fiber or combinations thereof. U.S. Pat. No. 4,457,985 generally discusses such oriented ultra-high molecular weight polyethylene and polypropylene fibers, and disclosure of which is hereby incorporated by reference to the extent not inconsistent herewith. In the case of polyethylene, suitable fibers are those highly oriented fibers of weight average molecular weight of at least about 200,000, preferably at least 500,000, more preferably at least about one million, and most preferably between about two million and about five million. Known as extended chain polyethylene (ECPE) fibers, such fibers may be produced from polyethylene solution spinning processes described, for example, in U.S. Pat. No. 4,137,394 to Meihuzen et al. or U.S. Pat. No. 4,356,138 to Kavesh et al., or spun from a solution to form a gel structure as described in German Off. No. 3,044,699, GB No. 2051667, and especially as described in U.S. Pat. No. 4,413,110.

The term polyethylene shall mean a predominantly linear polyethylene material that may contain minor amounts of chain branching or comonomers not exceeding 5 modifying units per 100 main chain carbon atoms and that may also contain admixed therewith up to about 25 weight percent of one or more polymeric additives, such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives, such as anti-oxidants, lubricants, ultra-violet screening agents, colorants and the like, which are commonly incorporated therewith.

The tenacity of the fibers is ordinarily at least about 15 grams/denier, preferably at least about 25 grams/denier, and most preferably at least about 30 grams/denier. Similarly, the tensile modulus of the fibers, as measured by an Instron tensile testing machine, is ordinarily at least about 300 grams/denier, preferably at least about 500 grams/denier, more preferably at least about 1,000 grams/denier, and most preferably at least about 1,500 grams/denier.

In the case of polypropylene, highly oriented polypropylene fibers of weight average molecular weight at least about 300,000, preferably 750,000, more preferably at least about one million, and most preferably at least about two million may be used. Ultra-high molecular weight polypropylene may be formed into reasonably highly oriented fibers by the techniques prescribed in the various references referred to above, and especially by the technique of U.S. Pat. No. 4,413,110. A suitable tenacity for polypropylene is at least about 8 grams/denier, with a preferred tenacity being at least about 11 grams/denier. The tensile modulus for polypropylene is at least about 160 grams/denier, preferably at least about 200 grams/denier. The melting point of the polypropylene fiber is preferably as least about 168° C., more preferably at least about 170° C. Employing fibers having a weight average molecular weight of at least about 750,000, can provide advantageously improved performance in the final article, especially in ballistic resistant articles.

Aramid fiber is formed principally from the aromatic polyamide. Aromatic polyamide fibers having a modulus of at least about 400 grams/denier and tenacity of at least about 18 grams/denier are useful for incorporation into composites of this invention. For example, poly)-phenylenediamine terphalamide) fibers produced commercially by Dupont Corporation under the trade name of Kevlar® 29 and 49 and having moderately high moduli and tenacity values are particularly useful in forming ballistic resistant composites. (Kevlar® 29 has 500 grams/denier and 22 grams/denier, and Kevlar® 49 has 1000 grams/denier and 22 grams/denier as values of modulus and tenacity, respectively).

Polyvinyl alcohol (PV-OH), fibers having a weight average molecular weight of at least about 200,000, preferably at least about 550,000, more preferably between about 1,000,000 and about 4,000,000, and most preferably between about 1,500,000 and about 2,500,000 may be employed in the present invention. Usable fibers should have a modulus of at least about 160 grams/denier, preferably at least about 200 grams/denier, and more preferably at least about 300 grams/denier, and a tenacity of at least about 7 grams/denier, preferably at least about 10 grams/denier, and most preferably at least 17 grams/denier. PV-OH fibers having a weight average molecular weight of at least about 500,000, a tenacity of at least about 200 grams/denier and a modulus of at least about 10 grams/denier are particularly useful in producing ballistic resistant composites. PV-OH fibers having such properties can be produced, for example, by the process disclosed in U.S. Pat. No. 4,599,267 to Kwon et al.

The fibers may be precoated with a polymeric material, preferably an elastomer based material, prior to being arranged as described above. The elastomeric material preferably has a tensile modulus, measured at about 23° C., of less than about 20,000 (138 mPa), and preferably less than 6,000 psi (41,400 kPa). Preferably, the tensile modulus of the elastomer is less than about 5,000 psi (34,500 kPa), and most preferably is less than about 2,500 (17,250 kPa) to provide even more improved performance. The glass transition temperature (Tg) of the elastomer (as evidenced by a sudden drop in the ductility and elasticity of the material) should be less than about 0° C. Preferably, the Tg of the elastomer is less than about −40° C., and more preferably is less than about −50° C. The elastomer should have an elongation to break of at least about 50%. Preferably, the elongation to break is at least about 100%, and more preferably, it is about 300% for more superior performance.

A wide variety of elastomeric materials and formulations may be utilized in this invention. Representative examples of suitable elastomers have their structures, properties, and formulations, together with cross-linking procedures summarized in the Encyclopedia of Polymer Science, Vol. 5, "Elastomers-Synthetic" (John Wiley & Sons, Inc., 1964). The matrix materials of this invention preferably have low moduli as noted above. For example, any of the following materials may be employed: polybutadiene, polyisoprene, natural rubber, ethylene-propylene copolymers, ethylenepropylene-diene terpolymers, polysulfide polymers, polyurethane elastomers, chlorosulfonated polyethylene, polychloroprene, plasticized polyvinylchloride using dioctyl phthalate, or other plasticizers well know in the art, butadiene acrylonitrile elastomers, poly(isobutylene-coisoprene), polyacrylates, polyesters, polyethers, fluorelastomers silicone elastomers, thermoplastic elastomers, copolymers of ethylene.

Other suitable matrix materials include polyethylenes, cross-linked polyethylenes, polypropylenes, ethylene copolymers, propylene copolymers and other olefin polymers and copolymers. Examples of such other matrix materials include unsaturated polyesters, phenolics, polybutyrals, epoxy resins and polyurethane resins and other low modulus resins curable below the melting point of the fiber.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type (AB)n(n=2−10) or radial configuration copolymers of the type R−(BA)×(x=30−150); wherein A is a block from a polyvinyl aromatic monomer and B is a block from a conjugated diene elastomer. Useful polymers are produced commercially by the Shell Chemical Co. and described in the bulletin "Kraton Thermoplastic Rubber", SC-68-81.

The low modulus elastomeric material may be compounded with fillers such as carbon black, silca, glass microballoons, etc., up to an amount not to exceed about 300% by weight of elastomer, preferably not to exceed about 100% by weight, and may be extended with oils and vulcanized by sulfur, peroxide, metal oxide or radiation cure systems using methods well known to rubber technologists of ordinary skill. Blends of different elastomeric materials may be used together or one or more elastomer materials may be blended with one or more thermoplastics. High density, low density, and linear low density polyethylene may be cross-linked to obtain a material of appropriate properties, either alone or as blends. The modulus of such modified compound refers to the total matrix composition.

The proportion of coating on the coated fibers or fabrics may vary from relatively small amounts (e.g., 1% by weight of fibers) to relatively large amounts (e.g., 150% by weight of fibers), depending upon whether the coating material has impact or ballistic resistant properties, and upon the rigidity, shape, heat resistance, wear resistance, flammability resistance and other properties desired for the composite article. Useful amounts of coating, based upon the weight of the fiber range from 5 to 100, preferably 10 to 50, and most preferably 10 to 30 percent.

Stated another way, the fiber network occupies different proportions of the total volume of the composite. Preferably, however, the fiber network comprises at least about 30 volume percent of the composite. For ballistic protection, the fiber network comprises at least about 50 volume percent, and most preferably at least about 70 volume percent, with the matrix occupying the remaining volume.

The coating may be applied to the fiber in a variety of ways. One method is to apply the resin of the coating material to the stretched high modulus fibers either as a liquid, a sticky solid or particles in suspension, or as a fluidized bed. Alternatively, the coating may be applied as a solution or emulsion in a suitable solvent which does not adversely affect the properties of the fiber at the temperature of application. While any liquid capable of dissolving or dispersing the coating polymer may be used, preferred groups of solvents include water, paraffin oils, ketones, alcohols, aromatic solvents or hydrocarbon solvents or mixtures thereof, with illustrative specific solvents including paraffin oil, xylene, toluene and octane. The techniques used to dissolve or disperse the coating polymers in the solvents will be those conventionally used for the coating of similar elastomeric materials on a variety of substrates.

Other techniques for applying the coating to the fibers may be used, including coating of the high modulus precursor before the high temperature stretching operation, either before or after removal of the solvent from the fiber. The fiber may then be stretched at elevated temperatures to produce the coated fibers. The extruded gel fiber may be passed through a solution of the appropriate coating polymer (solvent may be paraffin oil, aromatic or aliphatic solvent) under conditions to attain the desired coating. Crystallization of the high molecular weight polyethylene in the gel fiber may or may not have taken place before the fiber passes into the cooling solution. Alternatively, the fiber may be extruded into a fluidized bed of the appropriate polymeric powder.

The fiber used in the present invention, as indicated above, can be monofilament fiber, multifilament fiber, ribbons, strip or combinations thereof. The fiber can have regular or irregular cross-section. The fiber can be in the form of a monofilament or multifilament yarn. It can be twisted or untwisted.

The fiber in the fibrous elements used to form the fibrous layers of the present invention are preferably arranged unidirectionally in that each fiber is parallel to an adjacent fiber. The fibrous web is impregnated with a polymeric material to form the prepreg layer. The fibers in the layers can be continuous. The layer can be cut so that the longest continuous fiber in the layer is from 1 to 20, preferably 2 to 8, and more preferably 2 to 6 inches in length.

Each layer comprises an array of at least two adjacent coplanar fibrous elements. The fibers of adjacent layers are at an angle of from 45° to 90°, preferably 60° to 90°, more preferably 80° to 90°, and most preferably at an angle of about 90° from the fiber and the adjacent layers.

Figure 5:
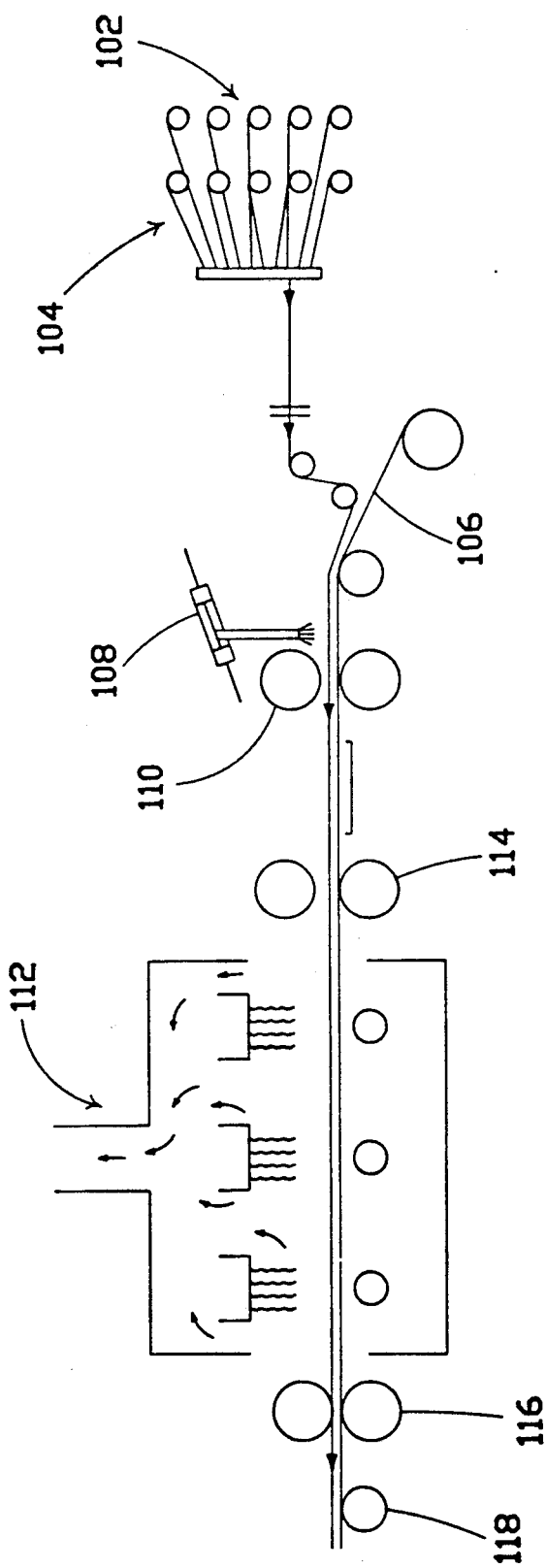
FIG. 5 is a schematic view of a process for making the coated web of the present invention.

FIG. 5 is a schematic view of a process to make the coated fibrous layers of the present invention. This typical process illustrates forming the fibrous layers from multifilament yarn and impregnating these fibers with matrix resin. The process generally comprises the steps of bringing the yarn in sheet form onto a carrier web and bringing the yarn laid in the unidirectional sheet form into contact with the matrix resin. The matrix resin can be in the form of solution, emulsion or melt. The next step is to consolidate the resin impregnated sheet. This can be accomplished by drying to remove the solvent or cooling to solidify the melt. The coated fibrous layer sheet is then rolled up and cut for use in accordance with the present invention.

A useful process is illustrated in FIG. 5. A plurality of yarn is supplied from creels 102 and passed through a combing stations 104. The combed yarn is then placed on a carrier web which can be a paper or film substrate 106. A polymer resin is applied to the yarn layer at 108. The coated yarn is then passed through a pair of rollers 110. The rollers spread the resin uniformly among the filaments of yarn. The impregnated yarn layer is then passed through a heated oven 112 for drying. Nip rollers 114 is used to control final layer thickness. Nip roller 116 is used to pull the carrier web and prepreg through the system. The substrate and the prepreg are wound on roller 118. The prepreg layer can then be cut into suitable elements to make the prepreg layers of the present invention.

Composite webs made using a plurality of coated fibrous layers (prepreg layers) are made using the above-described fibrous elements. A preferred way to make the prepregs is to lay-up individual layers and heat them and form them into the desired configuration. Suitable means include compression molding, stamping, or heating under pressure within an autoclave.

One technique for forming a composite includes the steps of arranging coated fibrous layer (prepreg sheet) into a desired element structure. The layers are then made into a composite by laying up the layers. The composite is then heated under pressure to cause the matrix material to flow and occupy the void spaces. In the above cases, it is possible that the matrix can be caused to stick or flow without completely melting. In general, if the matrix material is caused to melt, relatively little pressure is required to form the composite; while if the matrix material is only heated to a sticking point, generally more pressure is required. Also, the pressure and time to set the composite and to achieve optimal properties will generally depend on the nature of the matrix material (chemical composition as well as molecular weight) and processing temperature.

The layers of the composite web useful in the present invention typically contain from 5 to 30 fiber ends per inch (2 to 12 end per cm) and preferably 10 to 20 per inch (4 to 8 per cm). Each layer is typically from 0.0001 (0.0025) to 0.015 (0.38), preferably 0.0005 (0.0127) to 0.01 (0.25) more preferably 0.0005 (0.0127) to 0.005 (0.127), and most preferably 0.0005 (0.0127) to 0.0025 (0.064) inches (mm) thick. Layers having these dimensions are particularly useful when made of extended chain polyethylene having a yarn denier of about 1200 denier/118 filaments. The areal density is used to indicate the amount of fiber and/or resin per unit area of the prepreg layer. It is determined by the number of yarn strands laid per unit width of prepreg sheet and the amount of resin applied to the yarn. Typically, if a 1200 denier/118 filament yarn is laid by 15 ends per inch, the yarn aerial density in the prepreg sheet would be about 79 grams per square meter.

The layers of the present invention are preferably stacked in a 0°/90° sequence. However, sequences of alternating layers of 0/45/90/135 or 0/60/120/180 can be used. While 0/0/90/90 repeating units can be used, they are not preferred.

The composite webs can be molded in flat or three dimensional presses, stamped or molded in an autoclave. The main variables are pressure, time and temperature. Flat plaques can be molded between two plates of a molding press. The plates are heated to a controlled temperature. A molding press which has been used has a plate size of 2 feet by 2 feet and a molding pressure of up to 200 tons.

Figure 6:
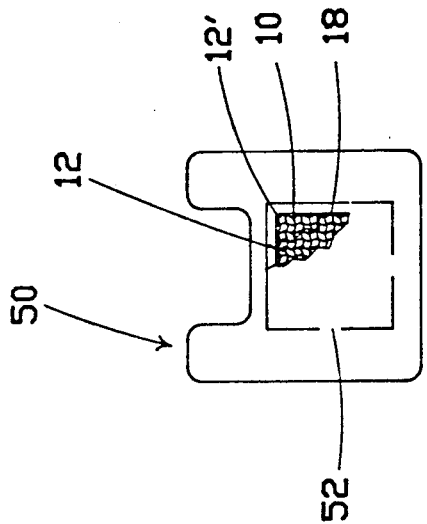
FIG. 6 illustrates the use of the coated web in ballistic resistant vests.

The coated flexible web of the present invention is useful to make a variety of articles including vests, curtains, mats, raincoats and umbrellas. FIG. 6 illustrates the use of the coated web 10 in ballistic resistant vest 50. The reference characters used with the coated web 10 corresponds to those in FIGS. 1 and 2 for common elements.

The vest 50 has at least one pouch or pocket 52 into which is inserted a plurality of coated webs 10. Preferably, there are from 2 to 20, and more preferably, 2 to 12 webs 10. Each web 10 preferably comprises from 2 to 50, and more preferably, from 2 to 20 layers 12, 12'. Useful vests made with the coated web of the present invention can be made in accordance with the structures disclosed in U.S. Ser. No. 081,074, filed Aug. 3, 1987, hereby incorporated by reference.

The following examples are presented to provide a more complete understanding of the invention, the specific techniques, conditions, materials, proportions and reported data set forth to illustrate the principles of the invention are exemplary and should not be construed as to limiting the scope of the invention.

EXAMPLE 1

The prepreg packets of the present invention were prepared by consolidation of a plurality of sheets comprised of unidirectional, high strength, extended chain polyethylene (ECPE) yarn impregnated with a thermoplastic elastomer matrix.

The yarn was Spectra 1000 produced by Allied-Signal Inc. and has a reported yarn tenacity of approximately 33 g/denier, a modulus of approximately 1250 g/denier, an energy-to-break of approximately 55 Joules/g, a yarn denier of approximately 650 and an individual filament denier of approximately 5.5 (118 filaments, untwisted yarn).

The prepreg layers were made by feeding yarn from a creel to form a web of yarn about 50 (130 cm) inches wide and having about 15 yarn ends per inch (12.54 cm). The web of yarn was pulled from creels and coated with Kraton D-1107 which is a styrene-isoprene-styrene block copolymer (SIS) leaving about 14% by weight styrene. This material is sold by the Shell Chemical Company and is described in the bulletin *Kraton Thermpolastic Rubber, Typical Property Guide Kraton D and Kraton G* It (No. SC:68-81). The specific Kraton D resin used was Kraton D-1107 which is reported to have a glass transition temperature of −55° C. The polymer has a reported melt index of 9 g/10 min. at ASTM 1238 Condition G, and a modulus tested using ASTM-D462 with a jaw separation speed of 10 in/min of 100 psi at 300% elongation.

The coating comprises a homogeneous solution of 6% Kraton D-1107 and about 94% by weight of methylene chloride. Ballistic panels were prepared in an identical manner as follows:

1. Prepreg layers, 15 inches × 15 inches square (3.8 cm × 3.8 cm), were stacked to form 10 layers, with the fibers of adjacent layers at a 90° angle from each other.
2. Linear low density polyethylene film was placed on the top and bottom of the stack.
3. Stacks were molded between layers of polytetrafluoroethylene (Teflon ®) coated fabric in a hydraulic press at 130° C. and 30 tons (267×10$^3$ N) force for 30 minutes. Three panels were molded simultaneously. One-half of the panels were flexed as follows:
1. Mild flexing—Each panel was wrapped around a polyvinylchloride cylinder 2.25 inches (5.7 cm) in diameter, four times. One side was taped onto a cylinder, and the panel wrapped around it. The sample was removed and re-wrapped after reversing sides. The whole procedure was repeated with an adjacent side taped to the cylinder.
2. Severe flexing—similar to mild flexing except each panel was wrapped around a cylinder 0.75 inches (1.9 cm) in diameter, four additional flexings were carried out with sides of the square panels 45 degrees to the cylinder length (corner was taped to cylinder—sides were reversed for second wrapping for a given orientation), and the panels were finally crumpled by compressing the entire panel into a compact ball.

Both procedures caused numerous opaque white lines to form in the panels generally along the fiber in the stacked prepreg layers, at 90° from each other.

The areal density (AD) of the prepreg is an indication of fiber weight per area. The total areal density (ADT) of the prepreg is an indication of composite weight per area.

The 15 inches × 15 inches (3.8 cm × 3.8 cm) square panels were assembled into targets having 8 panels per target with target AD = 3.60 kg/m$^2$ (fiber areal density) and ADT = 4.97 kg/m$^2$ (target areal density). Nine 9 mm bullets were fired into each target, normal to the target surface. Test procedure followed (National Institute of Justice) NIJ 0101.03 standard, using the standard clay backing with unflexed samples as Comparative 1, with mildly flexed samples as Example 1 and, with severely flexed samples as Example 2.

A simple drape test demonstrates that the flexed panels became much more flexible. The test was carried out on individual 15 inches × 15 inches (3.8 cm × 3.8 cm) square panels using a flat horizontal surface which intersects a vertical surface to produce a straight edge. One side of the panel was supported on the flat surface with 11 inches (279 cm) overhang. The horizontal distance of the unsupported edge from the vertical surface was measured. Drape ratio is the ratio of distance of the unflexed sample to the distance of the flexed sample. Results are shown below in Table 1 and 2.

TABLE 1

| Test Sample | | | Ballistic Threat | | | | Results | |
|---|---|---|---|---|---|---|---|---|
| Example Plies | Size (in) | Weight (lbs) | Caliber | Shots | Max. | Min. Velocity (fs) (30.5 cm/s) | Complete Pene. | Deform (in) |
| Comp. 1A 8 | 15 × 15 | — | 9 mm | 9 | 1422 | 1354 | 0 | — |
| Comp. 1B 8 | 15 × 15 | — | 9 mm | 9 | 1441 | 1402 | 0 | — |
| EX. 1A 8 | 15 × 15 | 1.46 | 9 mm | 9 | 1444 | 1307 | 0 | 1.25 |
| EX. 1B 8 | 15 × 15 | 1.46 | 9 mm | 9 | 1467 | 1307 | 0 | 1.40 |
| EX. 1C 8 | 15 × 15 | 1.46 | 9 mm | 9 | 1447 | 1359 | 0 | 1.30 |
| EX. 2 8 | 14 × 14 | 1.43 | 9 mm | 9 | 1464 | 1428 | 1 | 2.10 |

All samples had at least partial penetration. The maximum deformation of clay backing is 1.73 inches (4.4 cm). The flexed Example targets are as ballistically effective as the virgin Comparative targets.

TABLE 2

| | Single Panel Used In Targets | | |
|---|---|---|---|
| Example | Panel Condition | Distance (mm) | Drape Ratio |
| Comp. 1 | Original | 277 | — |
| Example 1 | Mildly Flexed | 235 | 1.18 |
| Example 2 | Severely Flexed | 51 | 5.43 |

While exemplary embodiments of the invention have been described, the true scope of the invention is to be determined from the following claims.

We claim:

1. A fibrous web comprising at least one layer comprising unidirectionally oriented fibers coated with a polymer composition, wherein the coated web is fixed sufficiently over at least a portion of the web surface to form a plurality of permanent creases distributed over the web surface and to increase the flexibility of the web.

2. The fibrous web of claim 1 wherein the coated web is subjected to a uniform flexing load.

3. The fibrous web of claim 1 flexed in a single direction.

4. The fibrous web of claim 1 folded at a fold angle of at least 45°.

5. The fibrous web of claim 4 wherein the coated web is folded at a fold angle of from 45° to 180°.

6. The fibrous web of claim 1 wrapped at least once around itself or a rod having a diameter of at least ⅛ inch.

7. The fibrous web of claim 1 wherein the coated web is from 0.01 to 1 cm thick.

8. The fibrous web of claim 1 wherein the ballistic resistance is substantially maintained in the flexed web compared to the unflexed web.

9. The fibrous web as recited in claim 1 wherein the fibers have a tensile modulus of at least about 160 g/denier and an energy-to-break of at least 7 J/g.

10. The fibrous web as recited in claim 1 wherein there are from 2 to 500 layers.

11. The fibrous web as recited in claim 10 wherein there are from 60 to 120 layers.

12. The fibrous web as recited in claim 1 wherein there are from 2 to 10 prepreg layers.

13. The fibrous web as recited in claim 1 wherein the fiber is selected from the group consisting of polyolefins, polyvinyl alcohol, polyaramid and combinations thereof.

14. The fibrous web as recited in claim 1 wherein the polymer composition has a tensile modulus of less than 6000 psi.

15. A fibrous web comprising at least two adjacent fibrous element each element comprising of plurality of unidirectionally oriented fibers embedded in a polymer matrix, the fibers in adjacent layers at an angle of from 45° to 90° to each other, the fibrous web is flexed sufficiently over at least a portion of the web surface to form a plurality of permanent creases distributed over the web surface and have a drape ratio of greater than 1.

16. The fibrous web as recited in claim 15 wherein the fiber is selected from the group consisting of polyolefins, polyvinyl alcohol, polyaramid and combinations thereof.

17. An article comprising at least one fibrous web comprising at least one layer comprising unidirectionally oriented fibers coated with a polymer composition, wherein the coated web is flexed sufficiently over at least a portion of the web surface to form a plurality of permanent creases distributed over the web surface and to increase the flexibility of the web.

18. The article as recited in claim 17 in the form of a ballistic resistant vest.

19. The article as recited in claim 18 wherein the vest comprises a plurality of separate fibrous webs.

20. The article as recited in claim 19 wherein there are from 2 to 12 fibrous webs, with each fibrous web having from 2 to 20 layers.

21. The article as recited in claim 7 wherein the fiber is selected from the group consisting of polyolefins, polyvinyl alcohol, polyaramid and combinations thereof.

22. The fibrous web as recited in claim 1 comprising at least two layers of the unidirectionally oriented fibers, wherein the fibers in each layer are arranged at a predetermined angle from each other.

23. The fibrous web as recited in claim 21 wherein the fibers in each layer are arranged at an angle of from 45° to 90° to each other.

24. The fibrous web as recited in claim 1 wherein the coated web is flexed sufficiently to have a drape ratio of greater than 1.

25. The fibrous web as recited in claim 1 wherein the coated web exhibits substantially no voids prior to flexing.

26. The fibrous web as recited in claim 1 wherein the coated web is flexed in substantially the same direction as the direction of the unidirectionally oriented fibers in at least one of the layers.

* * * * *